United States Patent [19]

Oshima

[11] 3,998,595
[45] Dec. 21, 1976

[54] APPARATUS FOR MELTING AND CRACKING AMORPHOUS POLYOLEFIN

[76] Inventor: Katsutoshi Oshima, No. 2-31, Tokiwadai, Itabashiku, Tokyo, Japan

[22] Filed: Dec. 8, 1975

[21] Appl. No.: 638,498

Related U.S. Application Data

[62] Division of Ser. No. 434,460, Jan. 18, 1974, Pat. No. 3,956,414.

[30] Foreign Application Priority Data

Sept. 6, 1973  Japan .............................. 48-99709

[52] U.S. Cl. .................................. 23/262; 23/263; 23/280
[51] Int. Cl.$^2$ .......................... B01J 1/00; C07C 3/26
[58] Field of Search .................... 23/262, 263, 280; 260/683 R

[56] References Cited

UNITED STATES PATENTS

| | | | |
|---|---|---|---|
| 2,395,829 | 3/1946 | King .............................. | 260/669 R |
| 2,461,004 | 2/1949 | Soday ............................ | 260/683.2 X |
| 2,470,361 | 5/1949 | Miller et al. .................. | 260/654 R X |
| 2,998,395 | 8/1961 | Ablert et al. .................. | 23/280 X |
| 3,441,628 | 4/1969 | Ratzsch et al. ................ | 208/20 X |

Primary Examiner—Morris O. Wolk
Assistant Examiner—Arnold Turk
Attorney, Agent, or Firm—Fred Philpitt

[57] ABSTRACT

Melting and cracking of amorphous polyolefin are carried out with a relatively small quantity of heat consumption and also with easiness in separating sludge, in converting it into oil by maintaining amorphous polyolefin at a high temperature of about 130° – 300° C for a relatively long time alone or together with a petroleum hydrocarbon oil to reduce the viscosity of the resultant melt to 5 – 250 CP, spraying the resultant melt upon lumps of amorphous polyolefin, separating impurities in the lumps as sludge, cracking the resultant molten mixture at a temperature of about 250° – 450° C and recovering oily products. For that purpose an apparatus comprising a combination of a holding tank for melt of amorphous polyolefin, a vessel for melting amorphous polyolefin equipped with a perforated plate or a wire-netting, a revolving shaft, a stirrer, etc., and a thermally cracking vessel equipped with a stirrer, a distillation means, and auxiliary means such as heating furnaces, pumping means for the melt and heating medium, is used.

6 Claims, 3 Drawing Figures

FIG. I

APPARATUS FOR MELTING AND CRACKING AMORPHOUS POLYOLEFIN

This is a division of application Ser. No. 434,460, filed Jan. 18, 1974 now U.S. Pat. No. 3,956,414.

DESCRIPTION OF THE INVENTION

This invention relates to a process for converting a solid or a semi-solid amorphous polyolefine resin into a liquid oily matter rich in olefin by melting and thermally cracking it and an apparatus useful in said process.

With the recent increase of the production of various polyolefin plastics, the treatment of scraps and by-products thereof has become a big problem requiring solution. For example, in the production of crystalline polypropylene, there are produced not only scraps of crystalline polyolefin itself but also a considerable amount of amorphous polyolefin is produced as a by-product, giving manufacturer troublesome problem of disposal. On this account various attempts have been proposed such as use of a specific catalyst capable of reducing its production as much as possible; use of by-product, amorphous polyolefin as an oil-adsorbing agent; use as a land reclaiming material, etc. However, the amount consumed in these usages is exceedingly small compared with the amount of amorphous polypropylene inevitably produced with the ever growing tremendous amount of crystalline polypropylene and hence amorphous polypropylene is still a troublesome by-product which gives a difficulty for disposal. In cases of other commercial polyolefins, e.g., various polyethylene, there is similar problem for disposal of by-products.

One approach to the solution of this problem is an attempt to thermally crack solid resinous by-products into lower molecular weight oily matter and it is partly used already in practice. However an efficient apparatus which enables to conduct a continuous operation for a long period of time has not been developed until now. There has been heretofore proposed an apparatus consisting of a melting vessel which melts polyolefin by heating into liquid state and a cracking vessel which cracks resultant liquid polyolefin in order to be used for such purpose. However, the amorphous polyolefin by-produced in polyolefin plants contains usually mixed impurities which tends to form sludge in various apparatus, which is very difficult to separate. There are also other disadvantages for this attempt, such as need of large-sized transportation pumps for molten liquid, a large quantity of heat per ton for converting into oil.

An object of the present invention is to provide a method for melting and cracking amorphous polyolefin in which separation of sludge from melt is easy. Another object of the present invention is to provide a method for melting and thermally cracking amorphous polyolefin with a relatively small quantity of heat in converting it into oil. The above-mentioned object can be attained by the method and apparatus of the present invention.

The method of the present invention i.e., a melting and thermally cracking method of amorphous polyolefin which is characterized in maintaining amorphous polyolefin alone or together with a petroleum hydrocarbon oil, at a temperature of about 130° to 300° C for a sufficiently long time to reduce the viscosity of the resulting melt down to 5 – 250 CP, spraying the melt upon lumps of amorphous polyolefin piled on a flat perforated structure in such a way that the proportion of the amount by weight of the melt to that of the lumps is at least 5 to promote the heat transmission from the melt to the lumps and to melt the lumps of amorphous polyolefin into liquid state, separating unmelted impurities in the lumps in the form of sludge, cracking the resulting separated liquid at a temperature of about 250° – 450° C and recovering an oily product.

The apparatus of the present invention is a melting and thermally cracking apparatus of amorphous polyolefins which is characterized by being provided with as principal members, a holding tank of melt of amorphous polyolefin in order to reduce the viscosity of the melt to 5 – 250 CP by maintaining said amorphous polyolefin alone or together with a petroleum hydrocarbon oil, at a temperature of about 130° – 300° C, a vessel for melting lumps of amorphous polyolefin, equipped with a flat perforated structure such as a perforated plate or wire-netting for loading the lumps, fixed at a position between the top and the bottom of the vessel, a revolving shaft which penetrates the flat perforated structure at its center, a stirrer close to the bottom of the vessel, a charging port of the lumps, a shower means for spraying the melt of amorphous polyolefin sent from the holding tank, upon the lumps, a funnel-like structure for promoting convection of heat and evaporation of moisture, a discharging port of the resulting melt and a take-out port of sludge at the bottom of the vessel, a cracking vessel equipped with a stirrer, which receives melt of amorphous polyolefin and cracks it at a temperature of 250° – 450° C, a distillation means for distilling the resulting cracked liquid and gas, a heating furnace for melt of amorphous polyolefin, a heating furnace for heating the melt in the cracking furnace, a heating furnace of heating medium used for heating various means, and pumping and piping means for melt of amorphous polyolefin.

The process and the apparatus of the present invention will be more fully understood by the following detailed description which is made referring to the attached drawings in which.

Figure 1:
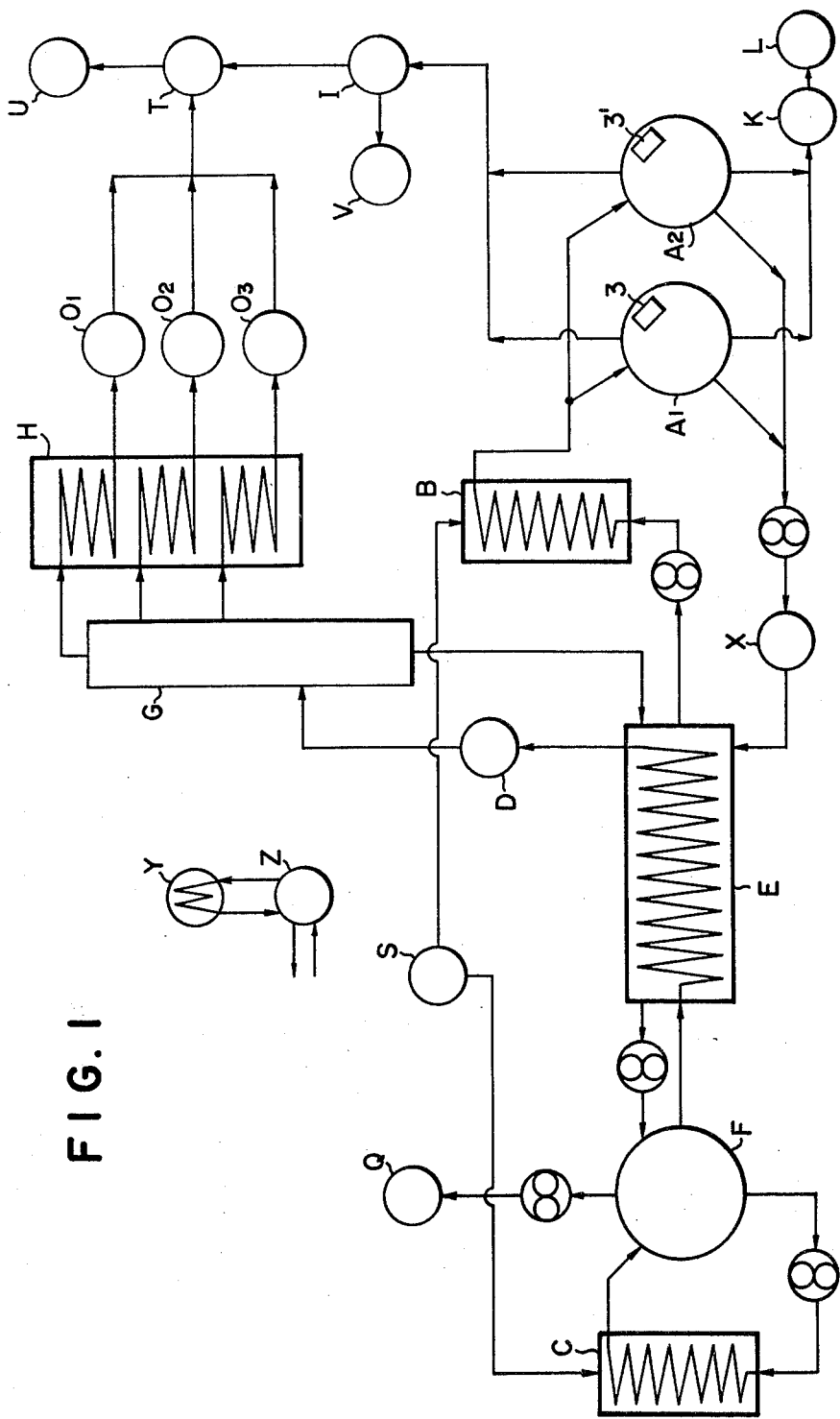
FIG. 1 is a flow-sheet for carrying out the process of the present invention and FIG. 2 is a schematic view of a vertical section of the melting vessel used in the method of the present invention.

Referring at first to FIG. 1 which is a flow sheet of the apparatus of the present invention, heavy oil is filled in holding tank E, sent to heating furnace B by a pump. The temperature of oil is elevated to a temperature of 130° to 300° C depending upon the kind and molecular weight of polyolefin.

Figure 2:
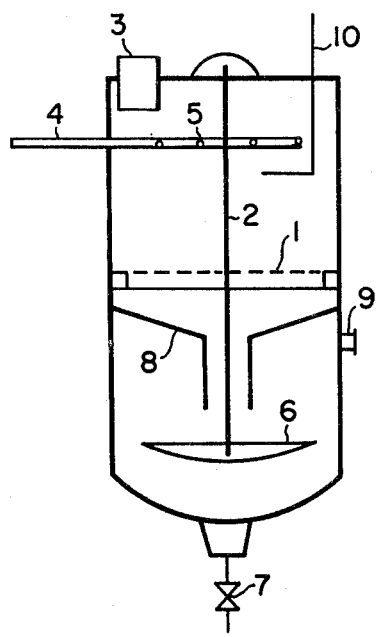

From hopper 3 or 3' for charging, lumps of amorphous polyolefin are charged into melting vessel $A_1$ or $A_2$ (the detail of which is shown in FIG. 2 and hence explanation will be made later referring to FIG. 2) and deposited on perforated plate 1 situated in the middle part of the vessel. The cover of hopper 3 or 3' is closed automatically, the heavy oil from holding tank E is passed through heating furnace B to raise its temperature to about 130° – 350° C, then through shower pipe 4 provided in the inside of and near the top of vessel $A_1$ or $A_2$ and sprayed from nozzle 5 over the above-mentioned deposited lumps of amorphous polyolefin to melt the latter. Heavy oil which has melted the amorphous polyolefin is passed through filter tank X and returned to holding tank E to keep its constant temperature of 130° – 300° C and its constant viscosity of about 5 – 250 CP. The heavy oil containing amorphous polyolefin is sent to cracking vessel F where it is recycled to heating furnace C, heated to about 250° – 450° C and amorphous polyolefin included therein is cracked. The liquid containing thermally cracked gas is passed through the heat exchanger coil of holding tank E, supplying heat to molten liquid in said tank E and is passed through buffer tank D, then sent to distillation apparatus G, condensed in condenser H and separated into products of several fractions and a heavy oil. Thus the heavy oil is used only during the starting time in holding tank E. The content of holding tank E becomes gradually molten amorphous polyolefin alone having a viscosity of 5 – 250 CP with the increase of the amount of new amorphous polyolefin charged.

In addition, in cases where an urgent treatment is required or where raw material having extremely high molecular weight is used, above procedure is often repeated with addition of petroleum hydrocarbon oil at an appropriate time to keep the viscosity of the molten liquid at 5 – 250 CP. It is necessary to select a residence time and hold the molten liquid of amorphous polyolefin which is to be sprayed in the above-mentioned melting vessel $A_1$ and $A_2$ for a sufficiently long time (usually about 15 hours) to make the viscosity of molten liquid fall in the range of 5 – 250 CP. However, as a special occasion if petroleum hydrocarbon oil is added, the above-mentioned holding time can be shortened. Even when molten liquid is brought to the state containing no more heavy oil after continuation of operation, the molten liquid is sprinkled in melting vessels $A_1$ and $A_2$ in order to dissolve amorphous polyolefin. The amount of the molten amorphous polyolefin whose viscosity is thermally degraded to 5 – 250 CP or the amount of the molten amorphous polyolefin which is admixed with petroleum hydrocarbon oil is about 5 – 13 times the weight of solid or semifluid solid polyolefin lumps which is to be melted. The subsequent procedures are carried out in the same manner as in case where heavy oil is incorporated.

The ratio of conversion to liquid oil in the process of the above-mentioned embodiment of the present invention is 70 – 80% of the amorphous polyolefin used. Since the heat quantity required per T of product is 300,000 – 400,000 K cal and since the heat quantity required in case of conventional manner of heating carried out with a direct-firing coiled pipe is 500,000 K cal, notable saving in fuel comsumption can be attained. In addition, compared with conventional process, the process of the present invention is less dangerous and easier for separating sludge. Moreover, since molten liquid of amorphous polyolefin is handled with a reduced viscosity, installations such as pumps, etc., become smaller size, leading to saving of electricity.

The product oil can be used as fuel oil, solvent and lubricating oil, and also used as raw material for paints after partial polymerization. The amount of sludge formed in cracking vessel F is about 5% by weight of the total amount. The sludge is a material rich in free carbonaceous matter. It is transferred to sludge tank Q by pumps and adequately admixed with light cracked oil or heavy cracked oil to be sold as fuel. It has a calorific value of about 11,000 Kcal/Kg. Sludge is produced also in holding tank E, but it is usually sent to the melting vessel. The amount of the sludge withdrawn from the melting vessel is about 5 – 10% of the total amount but the sludge is passed through strainer K and sent to sludge tank L, then supernatant liquid thereof is returned to the melting vessel. From the top of melting vessel of amorphous polyolefin $A_1$ and $A_2$, holding tank E and distillation apparatus G, exhaust gas containing water vapor and low boiling point materials is vented. The exhaust gas is passed through oil-water separator I, and water is recovered by passing through active carbon vessel V to be used again. If desired it is used as cooling water for condenser H.

Uncondensable gas is passed through gas tank T (2 – 6% of the total) and burnt in flared slag U.

A following example is given to illustrate the method and the apparatus of the present invention which is, however, not intended to limit the present invention.

EXAMPLE

In this example, amorphous polypropylene is used as an amorphous polyolefin, but similarly the process and the apparatus of this invention are also applicable to other amorphous polyolefins after slightly modifying the temperature. Lumps of amorphous polypropylene having a viscosity of 1200 CP in the state of molten liquid at 130° C are charged into melting vessel $A_1$ or $A_2$ from hopper 3 or 3' at a rate of 1 T/hr and deposited on perforated plate 1. 35 Kl of petroleum heavy oil having boiling point higher than 270° C is charged into holding tank E which has a radius of 1422 mm a length of 7220 mm and a volume of 38 Kl, then the heavy oil is circulated between holding tank E and heating furnace B by a pump at the rate of 25 m$^3$/hr and its temperature is raised to 260° C. The heavy oil is sent to shower pipe 4 of either of two melting vessel $A_1$ or $A_2$ having the same shape and the same volume and sprinkled over the amorphous polypropylene deposited on perforated plate 1 from nozzle 5. Charged amount of amorphous polypropylene is 5 m$^3$ at a bulk density of 0.2 per one dissolving vessel and treated amount is 5 m$^3$/hr. The amount of amorphous polypropylene on perforated plate 1 can be watched externally by level meter 10. Molten liquid containing dissolved amorphous polypropylene flows down from perforated plate 1 and further flows on guide funnel 8 of molten liquid as thin film while evaporating water and lower boiling materials and molten liquid containing sludge is guided downward to the lower part of melting vessel $A_1$ or $A_2$ and is sent to the bottom of melting vessel $A_1$ or $A_2$ in order to smooth the flow of heat by convection. With regard to the prevention of sludge from adhering, stirring is continued at the lower part with stirring blade 6 which is slowly driven by shaft 2.

First, sludge is carried to the bottom of melting vessel $A_1, A_2$ automatically by molten liquid guide funnel 8 and is withdrawn from sludge discharge port 7, then is passed through strainer K and separated at sludge tank L. The amount of sludge which varies depending upon raw material polypropylene is about 5 – 10%. The lower part of melting vessel is covered with mantles over the area of 8.487 m$^2$ in order to keep a temperature by using a heating medium oil having been heated at heating furnace Y and sent from heating medium oil tank Z which is maintained at a high temperature.

Figure 3:
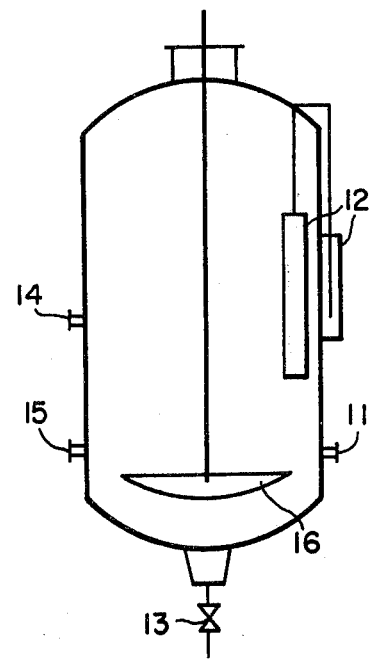
FIG. 3 is a schematic view of a vertical section of the cracking vessel used in the method of the present invention.

Supernatant melt of amorphous polypropylene is sent from discharge port 9 for supernatant molten liquid via filter tank X to holding tank E. For a while from starting there is amorphous polypropylene dissolved in heavy oil in holding tank E, but since heavy oil is used only for a while at starting time and since it is removed at the distillation apparatus, operation is continued in the state containing amorphous polypropylene alone, in the normal operation for a long time. The molten polypropylene is delivered to a position close to the bottom of cracking vessel F (refer to FIG. 3, volume is about 18 m³) equipped with stirrer 16. On the other hand, a portion of molten liquid in the tank is withdrawn from a position near the bottom and is sent to heating furnace C to raise its temperature to 430° – 450° C (0.5 CP) then returned to the upper part of the tank. The temperature of the liquid in cracking vessel F is kept at 400° C. Cracking vessel F is provided with an entrance for molten liquid 14 to receive molten liquid having a temperature of 260° C and also stirrer 16. Molten liquid is sent from molten liquid discharge port 15 to heating furnace C by a pump and after being decomposed partly, at a temperature of 450° C, it returns through liquid return port 11 to cracking vessel F. Further, cracking vessel F is equipped with liquid level gauge 12. By using it, operation is carried out in such a way that port 11 for liquid returning from heating furnace C is kept below the liquid level. Cracked gas in cracking vessel F is led to a coil in holding tank E to effect heat exchange and after heating indirectly the liquid in holding tank E, it is passed through buffer tank D and sent to distillation apparatus G to separate the material into fractions of lower than 300° C, from 300° C to 370° C and higher than 370° C. These fractions are received in product tanks $O_1, O_2, O_3$, amounts of which are as follows.

| range of fraction | | proportion of decomposed material | amount obtained from 3500 Kg of raw material |
|---|---|---|---|
| lower than 300° C | top gas | 20% | 500 Kg |
| 300° – 370° C | gas oil | 35% | 875 Kg |
| higher than 370° C | gas oil and bottom | 45% | 1125 Kg |

Noncondensable gas and lower boiling point materials generated from each apparatus are sent to oil-water separator I or gas tank T. Among these, the water from oil-water separator is passed through active carbon vessel V and collected for reuse. The amount of uncondensable gas from oil-water separator I and each apparatus is about 3%. It is burnt at flare stack U. For the temperature maintenance of each piping from heating furnace B and C to holding tank E and decomposing vessel F, heating medium oil (Nisseki high thermo 120 (trade name)) from heating medium oil tank Z is used.

Heating furnace B is used to heat the molten liquid in holding tank E and heating furnace C is used to heat the liquid in decomposing vessel F. Sludge is withdrawn from sludge discharge port 13 of cracking vessel by a pump at every 10 hours and transferred to sludge tank Q. The resultant sludge is about 5% of the total. It is a material rich in free carbonaceous materials and can be sold as fuel oil. For the purpose of fuel oil, it is preferable to be mixed with a suitable proportion of light or heavy cracked oil. Sludge in melting vessel $A_1,A_2$ is removed through strainer K and supernatant liquid is returned to melting vessels $A_1,A_2$. Sludge formed in holding tank E is sent to melting vessel $A_1$ and $A_2$. Also from melting vessels $A_1$ and $A_2$, exhaust gas is discharged. It consists of steam and lower boiling point materials. The amount of the steam resulting from 3500 Kg of amorphous polypropylene is 300 Kg.

What is claimed is:

1. Apparatus for melting and thermally cracking a solid, amorphous polyolefin material comprising, holding tank means adapted to hold a melted body of amorphous polyolefin material for an extended period of time, heating means for said holding tank operatively associated with said holding tank and adapted to heat said melted body of polyolefin material and reduce the viscosity thereof, melting tank means including a perforated support means disposed at an intermediate point in said melting tank and adapted to maintain a bed of lumps of solid amorphous polyolefin material, supply means adapted to withdraw at least a portion of said melted polyolefin of reduced viscosity from said holding tank and pass the same through said bed of lumps of polyolefin at a weight ratio of said melted polyolefin of reduced viscosity to said lumps of polyolefin sufficient to melt said lumps of polyolefin and stirring means disposed in said melting tank below said perforated support, means for withdrawing a sludge phase, containing unmelted impurities, from said melting tank at a point below said perforated support, means for withdrawing a liquid phase of melted polyolefin from said melting tank at a point below said perforated support and passing the same to said holding tank, a cracking vessel adapted to thermally crack melted polyolefin material including a stirring means disposed therein, means for heating said cracking vessel, means for withdrawing a portion of said melted polyolefin from said holding tank and passing the same to said cracking vessel and means for recovering a liquid oil product from said effluent from said cracking vessel.

2. Apparatus in accordance with claim 1 wherein the melting tank additionally includes a guide funnel disposed below the perforated support and adapted to pass the melted polyolefin from said perforated plate to the bottom of said melting tank.

3. Apparatus in accordance with claim 1 wherein the supply means for withdrawing melted polyolefin of reduced viscosity from the holding tank and passing the same through the bed of lumps of polyolefin includes spray means for spraying said melted polyolefin of reduced viscosity on top of said bed of lumps of polyolefin.

4. Apparatus in accordance with claim 1 wherein the heating means for the holding tank and the means for withdrawing cracked effluent from the cracking vessel include heat exchange means for indirectly heating the melted body of polyolefin in said holding tank with said cracked effluent.

5. Apparatus in accordance with claim 1 wherein the melting tank additionally includes feed means for continuously supplying lumps of polyolefin to the bed of polyolefin on the perforated support.

6. Apparatus in accordance with claim 1 wherein the means for recovering a liquid oil product from the cracked effluent is a distillation means.

* * * * *